(12) United States Patent
Groot

(10) Patent No.: US 7,694,430 B1
(45) Date of Patent: Apr. 13, 2010

(54) LOCKING PLUG SYSTEM

(76) Inventor: Daniel J. Groot, P.O. Box 17856, Clearwater, FL (US) 33762

( * ) Notice: Subject to any disclaimer, the term of this patent is extended or adjusted under 35 U.S.C. 154(b) by 77 days.

(21) Appl. No.: 12/283,166

(22) Filed: Sep. 10, 2008

Related U.S. Application Data

(60) Provisional application No. 60/994,251, filed on Sep. 18, 2007, provisional application No. 60/995,618, filed on Sep. 26, 2007.

(51) Int. Cl.
*G01F 23/04* (2006.01)
*B65D 55/14* (2006.01)

(52) U.S. Cl. ........................................ 33/728
(58) Field of Classification Search ............... 33/722, 33/728
See application file for complete search history.

(56) References Cited

U.S. PATENT DOCUMENTS

| | | | |
|---|---|---|---|
| 4,035,921 A * | 7/1977 | Williams | 33/728 |
| D258,871 S * | 4/1981 | Rajotte et al. | D10/57 |
| 4,368,579 A * | 1/1983 | Bauer | 33/728 |
| 5,011,319 A * | 4/1991 | Levi et al. | 403/109.5 |
| 5,829,153 A * | 11/1998 | Hitchock | 33/728 |
| 6,883,546 B1 * | 4/2005 | Kobylinski | 138/89 |
| 7,546,693 B1 * | 6/2009 | Impellizeri | 33/731 |

* cited by examiner

*Primary Examiner*—Christopher W Fulton

(57) ABSTRACT

A stopper component has upper and lower ends. The stopper component is removably positioned in a cylindrical opening. A shaft/dipstick is positioned within the stopper component. The shaft/dipstick has an upper end adjacent to the upper end of the stopper component. The shaft/dipstick has a lower end. The lower end extends beneath the lower end of the stopper component. A lock has an interior end coupled to the upper end of the shaft/dipstick. In this manner positioning the lock in a first orientation will lock the stopper component in a cylindrical opening. Also in this manner positioning the lock in a second orientation will unlock the stopper component to facilitate removal of the stopper component from a cylindrical opening.

5 Claims, 3 Drawing Sheets

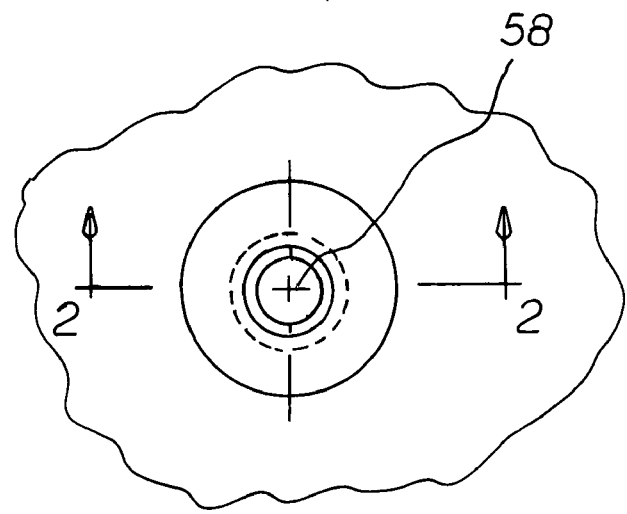
FIG. 1
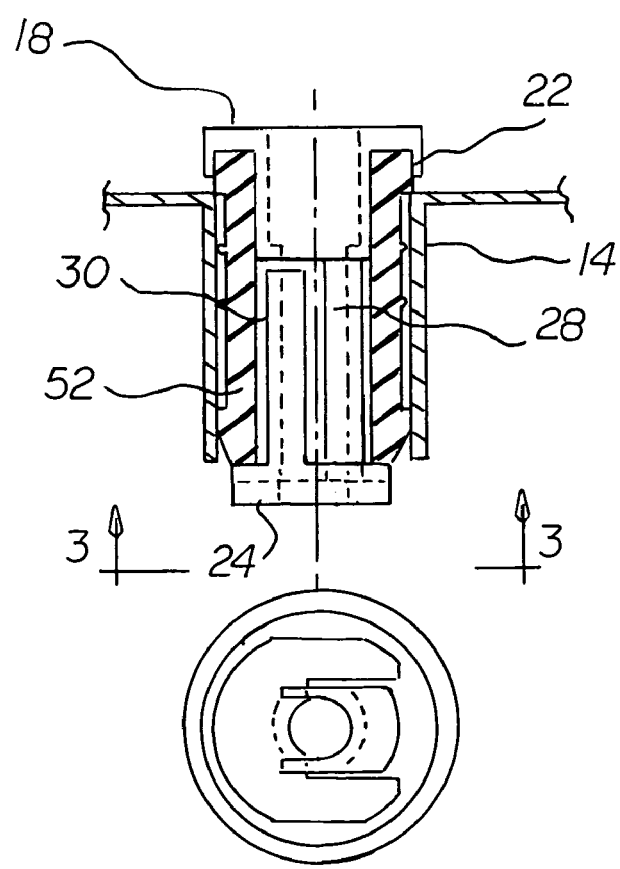
FIG. 2
FIG. 3

LOCKING PLUG SYSTEM

RELATED APPLICATION

The present application is based upon U.S. Provisional Applications 60/994,251 filed Sep. 18, 2007 and 60/995,618 filed Sep. 26, 2007, the subject matter of which applications is incorporated herein by reference.

BACKGROUND OF THE INVENTION

1. Field of the Invention

The present invention relates to a locking plug system and more particularly pertains to being removably positioned in a fill tube to insure the integrity of the contents of an oil reservoir, all in a safe, convenient and economical manner.

2. Description of the Prior Art

The use of plugs of known designs and configurations is known in the prior art. More specifically, plugs of known designs and configurations previously devised and utilized for the purpose of securing contents through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. Des. 258,871 filed Apr. 14, 1981 to Rojotte relates to an Oil Plug Temperature Gauge.

While this device fulfills is particular objectives and requirements, the aforementioned patent does not describe a locking plug system that allows for being removably positioned in a fill tube to insure the integrity of the contents of an oil reservoir, all in a safe, convenient and economical manner.

In this respect, the locking plug system according to the present invention substantially departs from the conventional concepts and designs of the prior art, and in doing so provides an apparatus primarily developed for the purpose of being removably positioned in a fill tube to insure the integrity of the contents of an oil reservoir, all in a safe, convenient and economical manner.

Therefore, it can be appreciated that there exists a continuing need for a new and improved locking plug system which can be used for being removably positioned in a fill tube to insure the integrity of the contents of an oil reservoir, all in a safe, convenient and economical manner. In this regard, the present invention substantially fulfills this need.

SUMMARY OF THE INVENTION

In view of the foregoing disadvantages inherent in the known types of plugs of known designs and configurations now present in the prior art, the present invention provides an improved locking plug system. As such, the general purpose of the present invention, which will be described subsequently in greater detail, is to provide a new and improved locking plug system and method which has all the advantages of the prior art and none of the disadvantages.

To attain this, the present invention essentially comprises a locking plug system. First provided is a rigid fill tube. The fill tube is in a cylindrical configuration. The fill tube has a vertical axis. The he fill tube has an upper end. The fill tube has a lower end. The upper and lower ends are separated by a length. The lower end is adapted to be attached to an enlarged oil reservoir. The fill tube has a exterior surface. The fill tube also has an interior surface. The interior surface has a radius.

A housing is provided. The housing has a central extent. The central extent is in a hollow cylindrical configuration. The central extent has an interior surface. The central extent has an exterior surface. The central extent has an upper end. The upper end is provided interior of and in proximity to the upper end of the fill tube. The central extent has a lower end. The lower end is provided interior of and in proximity to the lower end of the fill tube. The housing has an upper radial enlargement. The upper radial enlargement is formed as an extension of the upper end of the central extent. The housing has a lower radial enlargement. The lower radial enlargement is formed as an extension of the lower end of the central extent. The lower radial enlargement has a periphery. The periphery has an exterior radius. The exterior radius of the periphery is normally less than the interior radius of the fill tube.

The central extent and the lower radial enlargement have a fixed generally semi-cylinder and a laterally shiftable generally semi-cylinder. The fixed semi-cylinder is integrally formed with the upper radial enlargement. Parallel vertical slots are formed between the fixed and generally movable semi-cylinders.

Provided next is a bore. The bore is in a cylindrical configuration. The bore extends through the upper radial enlargement and the central extent of the housing and the lower radial enlargement. The bore has an enlarged upper chamber. The upper chamber is provided in the upper radial enlargement.

A cylindrical dip stick is provided. The dip stick is axially shiftable within the bore. The shaft has an upper enlarged end. The upper enlarged end is located in the upper chamber. The shaft has a lower end. The lower end has an elongated extension. The elongated extension extends beneath the lower radial extension. In this manner the elongated extension functions as a dip stick. The dip stick has an exterior surface. The dip stick has an upper section. The upper section has a first larger diameter. The dip stick has a lower section. The lower section has a second smaller diameter. The dip stick also has an intermediate tapering section.

Further provided is an elastomeric stopper. The elastomeric stopper has an interior aperture. The interior aperture receives the housing. The stopper has an upper end. The upper end is provided in contact with the upper enlargement. The stopper has a lower end. The lower end is provided in contact adjacent to the lower enlargement. The lower end of the stopper is provided at an elevation above the lower enlargement.

Provided last is a lock. The lock is provided within the upper housing. The lock has a lower end. The lower end is attached to the upper end of the shaft. The lock has an exposed upper end. The upper end has a key hole. A key is provided. They key is positionable in the key hole. A cam finger is provided. The cam finger is positionable in an L-shaped slot in the housing. The key and cam finger are adapted to be rotated in a first orientation. In this manner the full insertion of the shaft into the housing is allowed to expand the semi-cylinders and the lower enlargements. Also in this manner the shaft is locked into the housing and the housing into a fill tube. Positioning the lock in a second orientation will allow the withdrawal of the shaft from the housing to contract the semi-cylinders and the lower enlargements to unlock the shaft from the housing. Also in this manner shaft may be removed from the housing and the housing removed from a fill tube. The stopper is fabricated of an elastomeric material. The elastomeric material is chosen from the class of elastomeric materials. The class of elastomeric materials includes plastic and rubber, natural and synthetic, and blends thereof.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved locking plug system which has all of the advantages of the prior art plugs of known designs and configurations and none of the disadvantages.

It is another object of the present invention to provide a new and improved locking plug system which may be easily and efficiently manufactured and marketed.

It is further object of the present invention to provide a new and improved locking plug system which is of durable and reliable constructions.

An even further object of the present invention is to provide a new and improved locking plug system which is susceptible of a low cost of manufacture with regard to both materials and labor, and which accordingly is then susceptible of low prices of sale to the consuming public, thereby making such locking plug system economically available to the buying public.

Even still another object of the present invention is to provide a locking plug system for being removably positioned in a fill tube to insure the integrity of the contents of an oil reservoir, all in a safe, convenient and economical manner.

Lastly, it is an object of the present invention to provide a new and improved locking plug system. A stopper component has upper and lower ends. The stopper component is removably positioned in a cylindrical opening. A shaft/dipstick is positioned within the stopper component. The shaft/dipstick has an upper end adjacent to the upper end of the stopper component. The shaft/dipstick has a lower end. The lower end extends beneath the lower end of the stopper component. A lock has an interior end coupled to the upper end of the shaft/dipstick. In this manner positioning the lock in a first orientation will lock the component in a cylindrical opening. Also in this manner positioning the lock in a second orientation will unlock the stopper component to facilitate removal of the stopper component from a cylindrical opening.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred primary and alternate embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a plan view of a locking plug system constructed in accordance with the principles of the present invention.

FIG. 2 is a cross sectional view of the system taken along line 2-2 of FIG. 1.

FIG. 3 is a bottom view of the system taken along line 3-3 of FIG. 2.

The same reference numerals refer to the same parts throughout the various Figures.

DESCRIPTION OF THE PREFERRED EMBODIMENT

Figure 4:
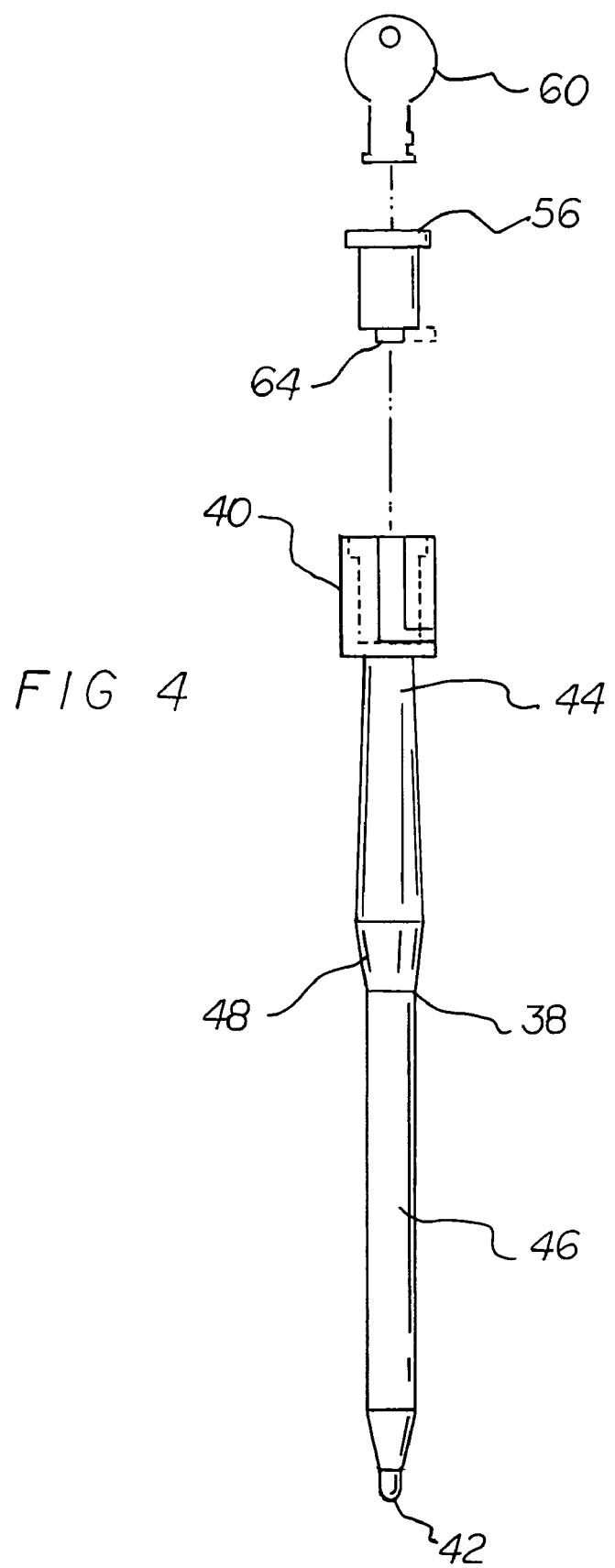
FIG. 4 is an exploded view of the system shown in the prior Figures.
Figure 5:
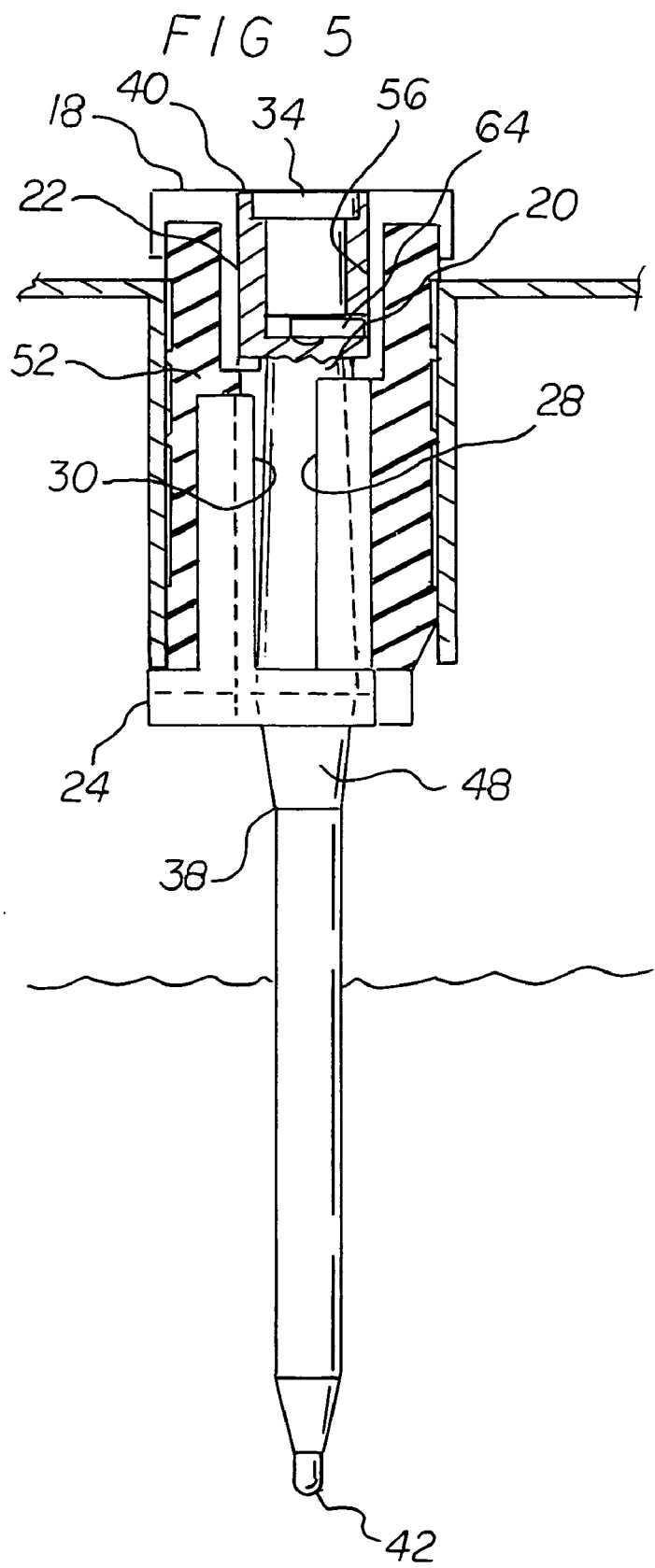
FIG. 5 is a cross sectional view of the system when in the locked orientation.

With reference now to the drawings, and in particular to FIG. 1 thereof, the preferred embodiment of the new and improved locking plug system embodying the principles and concepts of the present invention and generally designated by the reference numeral 10 will be described.

The present invention, the locking plug system 10 is comprised of a plurality of components. Such components in their broadest context include a stopper component, a shaft and a lock. Such components are individually configured and correlated with respect to each other so as to attain the desired objective.

First provided is a rigid fill tube 14. The fill tube is in a cylindrical configuration. The fill tube has a vertical axis. The he fill tube has an upper end. The fill tube has a lower end. The upper and lower ends are separated by a length. The lower end is adapted to be attached to an enlarged oil reservoir. The fill tube has a exterior surface. The fill tube also has an interior surface. The interior surface has a radius.

A housing 18 is provided. The housing has a central extent 20. The central extent is in a hollow cylindrical configuration. The central extent has an interior surface. The central extent has an exterior surface. The central extent has an upper end. The upper end is provided interior of and in proximity to the upper end of the fill tube. The central extent has a lower end. The lower end is provided interior of and in proximity to the lower end of the fill tube. The housing has an upper radial enlargement 22. The upper radial enlargement is formed as an extension of the upper end of the central extent. The housing has a lower radial enlargement 24. The lower radial enlargement is formed as an extension of the lower end of the central extent. The lower radial enlargement has a periphery. The periphery has an exterior radius. The exterior radius of the periphery is normally less than the interior radius of the fill tube.

The central extent and the lower radial enlargement have a fixed generally semi-cylinder 28 and a laterally shiftable generally semi-cylinder 30. The fixed semi-cylinder is integrally formed with the upper radial enlargement. Parallel vertical slots are formed between the fixed and generally movable semi-cylinders.

Provided next is a bore 34. The bore is in a cylindrical configuration. The bore extends through the upper radial enlargement and the central extent of the housing and the lower radial enlargement. The bore has an enlarged upper chamber 36. The upper chamber is provided in the upper radial enlargement.

A cylindrical shaft/dip stick 38 is provided. The dip stick is axially shiftable within the bore. The shaft has an upper enlarged end 40. The upper enlarged end is located in the upper chamber. The shaft has a lower end 42. The lower end has an elongated extension. The elongated extension extends beneath the lower radial extension. In this manner the elongated extension functions as a dip stick. The dip stick has an exterior surface. The dip stick has an upper section 44. The upper section has a first larger diameter. The dip stick has a lower section 46. The lower section has a second smaller diameter. The dip stick also has an intermediate tapering section 48.

Further provided is an elastomeric stopper 52. The elastomeric stopper has an interior aperture. The interior aperture receives the housing. The stopper has an upper end. The upper end is provided in contact with the upper enlargement. The stopper has a lower end. The lower end is provided in contact adjacent to the lower enlargement. The lower end of the stopper is provided at an elevation above the lower enlargement.

Provided last is a lock 56. The lock is provided within the upper housing. The lock has a lower end. The lower end is attached to the upper end of the shaft. The lock has an exposed upper end. The upper end has a key hole 58. A key 60 is provided. They key is positionable in the key hole. A cam finger 64 is provided. The cam finger is positionable in an L-shaped slot in the housing. The key and cam finger are adapted to be rotated in a first orientation. In this manner the full insertion of the shaft into the housing is allowed to expand the semi-cylinders and the lower enlargements. Also in this manner the shaft is locked into the housing and the housing into a fill tube. Positioning the lock in a second orientation will allow the withdrawal of the shaft from the housing to contract the semi-cylinders and the lower enlargements to unlock the shaft from the housing. Also in this manner shaft may be removed from the housing and the housing removed from a fill tube. The stopper is fabricated of an elastomeric material. The elastomeric material is chosen from the class of elastomeric materials. The class of elastomeric materials includes plastic and rubber, natural and synthetic, and blends thereof.

As an optional feature of the invention, the upper section of the housing is tapered at about 5 degrees. The higher end has a smaller diameter than the lower end. Such feature is to abate problems associated with the forces of vibration.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A lockable stopper system comprising:
    a stopper component with upper and lower ends, the stopper component being removably positioned in a cylindrical opening;
    a shaft/dipstick positioned within the stopper component, the shaft/dipstick having an upper end adjacent to the upper end of the stopper component, the shaft/dipstick having a lower end extending beneath the lower end of the stopper component; and
    a lock having an interior end coupled to the upper end of the shaft/dipstick whereby positioning the lock in a first orientation will lock the stopper component in a cylindrical opening and whereby positioning the lock in a second orientation will unlock the stopper component to facilitate removal of the stopper component from a cylindrical opening.

2. A lockable stopper system comprising:
    a housing having a central extent with upper and lower radial enlargements, the central extent and the lower radial enlargement being formed of a first and a second generally semi-cylinder, a bore in the housing;
    a shaft movably positioned within the bore, the shaft having an upper section of a first smaller diameter and a lower end of a second larger diameter and an intermediate tapering section;
    a stopper having an interior aperture receiving the housing, the stopper having an upper end in contact with the upper enlargement and a lower end in contact with the lower enlargement; and
    a lock within the upper housing, the lock having a lower end attached to the upper end of the shaft whereby positioning the lock in a first orientation will allow the full insertion of the shaft into the housing to expand the semi-cylinders and the lower enlargements to lock the shaft into the housing and the housing into a fill tube and whereby positioning the lock in a second orientation will allow the withdrawal of the shaft from the housing to contract the semi-cylinders and the lower enlargements to unlock the shaft from the housing and allow the removal of shaft from the housing and the removal of the housing from a fill tube.

3. A lockable stopper system adapted to be removable positioned in a fill tube to insure the integrity of the contents of an oil reservoir, all in a safe, convenient and economical manner, the system comprising, in combination:
    a rigid fill tube in a cylindrical configuration with a vertical axis, the fill tube having an upper end and a lower end separated by a length, the lower end adapted to be attached to an enlarged oil reservoir, the fill tube having a exterior surface and an interior surface with a radius;
    a housing having a central extent in a hollow cylindrical configuration with an interior surface and an exterior surface, the central extent having an upper end interior of and in proximity to the upper end of the fill tube, the central extent having a lower end interior of and in proximity to the lower end of the fill tube, the housing having an upper radial enlargement formed as an extension of the upper end of the central extent, the housing having a lower radial enlargement formed as an extension of the lower end of the central extent, the lower radial enlargement having a periphery with an exterior radius normally less than the interior radius of the fill tube;

the central extent and the lower radial enlargement being formed of a fixed generally semi-cylinder and a laterally shiftable generally semi-cylinder, the fixed semi-cylinder being integrally formed with the upper radial enlargement, parallel vertical slots formed between the fixed and generally movable semi-cylinders;

a bore in a cylindrical configuration extending through the upper radial enlargement and the central extent of the housing and the lower radial enlargement, the bore having an enlarged upper chamber in the upper radial enlargement;

a cylindrical dip stick axially shiftable within the bore, the shaft having an upper enlarged end located in the upper chamber, the shaft having a lower end having an elongated extension extending beneath the lower radial extension and functioning as a dip stick, the dip stick having an exterior surface with an upper section of a first larger diameter and a lower section of a second smaller diameter and an intermediate tapering section;

an elastomeric stopper having an interior aperture receiving the housing, the stopper having an upper end in contact with the upper enlargement, the stopper having a lower end in contact adjacent to the lower enlargement, the lower end of the stopper being at an elevation above the lower enlargement; and a lock within the upper housing, the lock having a lower end attached to the upper end of the shaft, the lock having an exposed upper end with a key hole, a key positionable in the key hole, and a cam finger positionable in an L-shaped slot in the housing, the key and cam finger adapted to be rotated in a first orientation will allow the full insertion of the shaft into the housing to expand the semi-cylinders and the lower enlargements to lock the shaft into the housing and the housing into a fill tube and whereby positioning the lock in a second orientation will allow the withdrawal of the shaft from the housing to contract the semi-cylinders and the lower enlargements to unlock the shaft from the housing and allow the removal of shaft from the housing and the removal of the housing from a fill tube, the stopper being fabricated of an elastomeric material chosen from the class of elastomeric materials including plastic and rubber, natural and synthetic, and blends thereof.

4. The system as set forth in claim 3 wherein the upper section of the housing is tapered with the higher end having a smaller diameter than the lower end in order to abate the forces of vibration.

5. The system as set forth in claim 4 wherein the tapered housing is about 5 degrees.

* * * * *